United States Patent
Park et al.

(10) Patent No.: US 12,254,524 B2
(45) Date of Patent: Mar. 18, 2025

(54) SYSTEM AND METHOD FOR PROVIDING TAXI SERVICE

(71) Applicants: Hyundai Motor Company, Seoul (KR); Kia Corporation, Seoul (KR)

(72) Inventors: Yunjoong Park, Seoul (KR); Jeongtaek Oh, Yongin-si (KR); Byeonghwi Choi, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 108 days.

(21) Appl. No.: 17/986,125

(22) Filed: Nov. 14, 2022

(65) Prior Publication Data
US 2023/0377084 A1  Nov. 23, 2023

(30) Foreign Application Priority Data
May 18, 2022 (KR) ........................ 10-2022-0061010

(51) Int. Cl.
  *G06Q 50/47* (2024.01)
  *G06Q 30/0283* (2023.01)
(52) U.S. Cl.
  CPC ......... *G06Q 50/47* (2024.01); *G06Q 30/0284* (2013.01)
(58) Field of Classification Search
  CPC ............................. G06Q 50/47; G06Q 30/0284
  See application file for complete search history.

(56) References Cited

U.S. PATENT DOCUMENTS

| | | | | |
|---|---|---|---|---|
| 6,028,537 | A * | 2/2000 | Suman | B60K 35/00 340/988 |
| 10,059,255 | B1 * | 8/2018 | Schreiber | G08G 1/005 |
| 2021/0354624 | A1 * | 11/2021 | Choi | B60Q 3/731 |
| 2022/0371474 | A1 * | 11/2022 | Kaku | B60Q 3/74 |

FOREIGN PATENT DOCUMENTS

| | | | |
|---|---|---|---|
| JP | 2009073242 A * | 4/2009 | |
| JP | 2019020984 A * | 2/2019 | |
| KR | 20120005795 A | 1/2012 | |
| KR | 101804638 B1 | 12/2017 | |
| KR | 101834548 B1 | 3/2018 | |
| KR | 20190054504 A | 5/2019 | |
| KR | 20210139050 A | 11/2021 | |

OTHER PUBLICATIONS

Elias, J. (Jan. 8, 2022). Taking a driverless Waymo in Phoenix over the holidays was fun but unsettling. CNBC. https://www.cnbc.com/2022/01/08/heres-what-it-was-like-to-ride-in-a-waymo-with-no-driver-in-phoenix.html (Year: 2018).*

* cited by examiner

*Primary Examiner* — Emmett K. Walsh
(74) *Attorney, Agent, or Firm* — Slater Matsil, LLP

(57) ABSTRACT

A system for providing a taxi service includes an integrated terminal connected to a payment server through a network, wherein the integrated terminal includes a meter unit configured to calculate an operation fee of a vehicle by using global positioning system (GPS) information or information collected by a sensor of the vehicle, transmit event information comprising operation fee payment information or destination arrival information to the vehicle, and be switched to be in an empty vehicle mode when receiving payment completion information from the payment server in response to a payment request.

14 Claims, 3 Drawing Sheets

SYSTEM AND METHOD FOR PROVIDING TAXI SERVICE

CROSS-REFERENCE TO RELATED APPLICATIONS

This application claims the benefit of Korean Patent Application No. 10-2022-0061010, filed on May 18, 2022, which application is hereby incorporated herein by reference.

TECHNICAL FIELD

The present invention relates to a system and method for providing a taxi service.

BACKGROUND

When a passenger exits a vehicle providing taxi service, an accident may occur due to a motorcycle or bicycle driven nearby.

Accordingly, not only the passenger, but also a driver providing a taxi service may be required to ensure safety by examining a surrounding risk factor when the passenger exits the vehicle providing taxi service.

Therefore, there is a need to prevent the driver's attention from being distracted by vehicle audio or the like when the passenger exits the vehicle providing taxi service.

Further, in addition to ensuring safety when the driver or passenger directly exits the vehicle providing taxi service, there is a need to develop a system in which a platform providing the taxi service, a credit card payment machine, a vehicle and the like are linked with one another to determine when the passenger exits the vehicle to take safety measures such as flashing an emergency light.

The above information disclosed in this background section is only for enhancement of understanding of the background of embodiments of the invention, and therefore it may contain information that does not form the prior art that is already known to a person of ordinary skill in the art.

SUMMARY

Exemplary embodiments of the present invention provide a system and method for providing a taxi service, in which an integrated terminal and a vehicle are linked with each other to determine when a passenger exits the vehicle providing taxi service to adjust an emergency light and audio volume.

Exemplary embodiments of the present invention provide a system and method for providing a taxi service, in which an integrated terminal and a payment server are linked with each other to determine when a passenger exits the vehicle providing taxi service to switch a mode of an app meter to be an empty vehicle mode.

According to an exemplary embodiment of the present invention, a system for providing a taxi service includes an integrated terminal connected to a payment server through a network, wherein the integrated terminal includes a meter unit calculating an operation fee of a vehicle by using global positioning system (GPS) information or information collected by a sensor of the vehicle, transmits event information to the vehicle, and is switched to be in an empty vehicle mode when receiving payment completion information in response to a payment request from the payment server, and the event information includes at least one of operation fee payment information and destination arrival information.

The vehicle may adjust at least one of an emergency light and an audio volume when receiving the event information from the integrated terminal.

The vehicle may adjust at least one of the emergency light and the audio volume when a driving speed is less than a predetermined speed.

The adjustment of the emergency light may include that the vehicle turns on the emergency light when the driving speed is less than the predetermined speed.

The adjustment of the audio volume may include that the vehicle minimizes the audio volume when the driving speed is less than the predetermined speed.

The vehicle may adjust at least one of an emergency light and an audio volume when a door is switched to be opened within a predetermined time.

The adjustment of the emergency light may include that the vehicle turns off the emergency light when the door is switched to be opened within the predetermined time.

The adjustment of the audio volume may include that the vehicle normalizes the audio volume when the door is switched to be opened within the predetermined time.

The empty vehicle mode may indicate a state where a driver stands by to provide the taxi service because no passenger is in the vehicle, and the meter unit may stand by without calculating the operation fee in the empty vehicle mode.

According to another exemplary embodiment of the present invention, a method for providing a taxi service includes calculating, by an integrated terminal, an operation fee of a vehicle by using global positioning system (GPS) information or information collected by a sensor of the vehicle, transmitting, by the integrated terminal, event information to the vehicle, and switching the integrated terminal to be in an empty vehicle mode when receiving payment completion information in response to a payment request from a payment server, wherein the event information includes at least one of operation fee payment information and destination arrival information.

The method may further include adjusting, by the vehicle, at least one of an emergency light and an audio volume when receiving the event information from the integrated terminal.

The adjusting, by the vehicle, of the at least one of the emergency light and the audio volume when receiving the event information from the integrated terminal may include adjusting, by the vehicle, at least one of the emergency light and the audio volume when a driving speed is less than a predetermined speed.

The adjusting, by the vehicle, of the at least one of the emergency light and the audio volume when receiving the event information from the integrated terminal may include adjusting, by the vehicle, at least one of the emergency light and the audio volume when a driving speed is less than a predetermined speed.

The adjusting, by the vehicle, of the at least one of the emergency light and the audio volume when the driving speed is less than the predetermined speed may include turning on, by the vehicle, the emergency light when the driving speed is less than the predetermined speed.

The method may further include adjusting, by the vehicle, at least one of an emergency light and an audio volume when a door is switched to be opened within predetermined time.

The adjusting, by the vehicle, of the at least one of the emergency light and the audio volume when the door is switched to be opened within the predetermined time may include turning off, by the vehicle, the emergency light when the door is switched to be opened within the predetermined time.

The adjusting, by the vehicle, of the at least one of the emergency light and the audio volume when the door is switched to be opened within the predetermined time may include normalizing, by the vehicle, the audio volume when the door is switched to be opened within the predetermined time.

The method may further include standing by, by the integrated terminal, without calculating the operation fee in the empty vehicle mode, wherein the empty vehicle mode indicates a state where a driver stands by to provide the taxi service because no passenger is in the vehicle.

According to the exemplary embodiments, it is possible to provide the system and method for providing a taxi service, which may improve the efficient communication between the driver and the passenger, minimize the driver's distraction, and promote the safety of the passenger.

According to the exemplary embodiments, it is possible to provide the system and method for providing a taxi service, which may increase conveniences of the driver and the passenger by quickly and easily reflecting the state of the vehicle.

Figure 1:
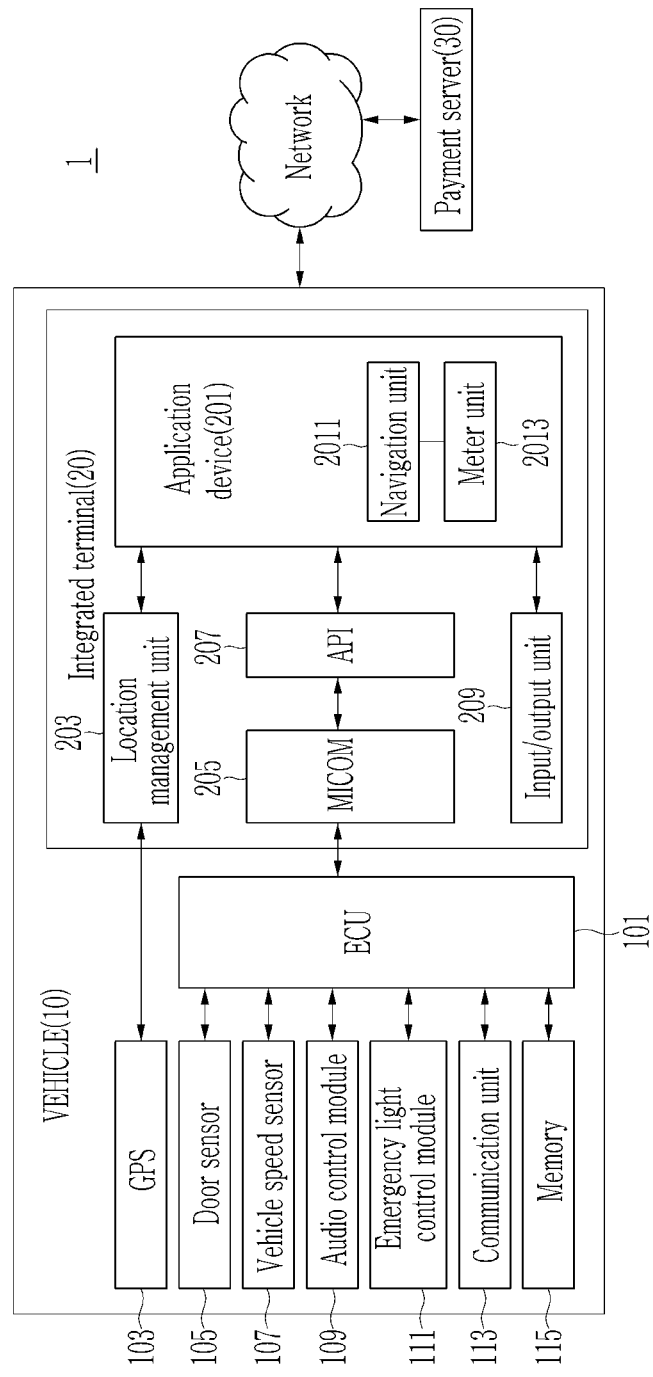
FIG. 1 is a block diagram schematically showing a configuration of a system for providing a taxi service according to an exemplary embodiment.

The following reference identifiers may be used in connection with the accompanying drawings to describe exemplary embodiments of the present disclosure.

1: system for providing a taxi service
10: vehicle
101: ECU (Electronic Control Unit)
103: GPS
105: door sensor
107: vehicle speed sensor
109: audio control module
11: emergency light control module
113: communication unit
115: memory
20: integrated terminal
201: application device
2011: navigation unit
2013: meter unit
203: location management unit
205: MICOM (microcomputer)
207: API (Application Programming Interface)
209: input/output unit
30: payment server

DETAILED DESCRIPTION OF ILLUSTRATIVE EMBODIMENTS

Hereinafter, exemplary embodiments disclosed in the present specification are described in detail with reference to the accompanying drawings, components that are the same as or similar to each other are denoted by the same or similar reference numerals, and an overlapping description thereof is omitted.

Terms "module" and/or "unit" for components described in the following description are used only to make the specification easily understood. Therefore, these terms do not have meanings or roles distinguished from each other in themselves.

Further, in describing the exemplary embodiments of the present invention, in a case where it is decided that a detailed description for the known art related to an embodiment of the present invention may obscure the gist of the exemplary embodiments of the present invention, the detailed description thereof is omitted.

Furthermore, it is to be understood that the accompanying drawings are provided only to allow the exemplary embodiments of the present disclosure to be easily understood, and the spirit of the present disclosure is not limited by the accompanying drawings and includes all the modifications, equivalents and substitutions included in the spirit and scope of the present disclosure.

Terms including ordinal numbers such as "first," "second" and the like may be used to describe various components. However, these components are not limited by these terms.

The terms are used only to distinguish one component from another component.

It is to be understood that terms such as "include," "have" and the like used in the present application specify the presence of features, numerals, steps, operations, components, parts or combinations thereof, mentioned in the specification, and do not preclude the presence or addition of one or more other features, numerals, steps, operations, components, parts or combinations thereof.

A program implemented as a set of instructions embodying a control algorithm necessary to control another configuration may be installed in a configuration for controlling another configuration under a specific control condition among configurations according to an exemplary embodiment.

The control configuration may process input data and stored data, based on the installed program to generate output data.

The control configuration may include a non-volatile memory storing the program and a memory storing the data.

FIG. 1 is a block diagram schematically showing a configuration of a system for providing a taxi service according to an exemplary embodiment.

A system 1 for providing a taxi service may include a vehicle 10 and a payment server 30.

As shown in FIG. 1, the vehicle 10 and the payment server 30 may transmit/receive necessary information through a network.

In this case, the vehicle 10 may be a taxi operated by a driver who provides a taxi service to a passenger.

In embodiments of the present invention, the network may be a personal area network (PAN), a local area network (LAN), a campus area network (CAN), a metropolitan area network (MAN), a wide area network (WAN), a broadband network (BBN), a wireless LAN (WLAN), a storage area network (SAN) or a controller area network (CAN), or may be a cellular communication such as a long term evolution (LTE), an LTE advanced (LTE-A), a code-division multiple access (CDMA), a wideband code division multiplex access (WCDMA), a universal mobile telecommunication system (UMTS), a wireless broadband (WiBro) or a global system for mobile communications (GSM), and is not limited thereto.

The vehicle 10 may include an electronic control unit (ECU) 101, a global positioning system (GPS) 103, a door sensor 105, a vehicle speed sensor 107, an audio control module 109, an emergency light control module 111, a communication unit 113, a memory 115, and an integrated terminal 20.

The vehicle 10 may transmit/receive necessary information to and from the integrated terminal 20 by transmitting information obtained through the sensor or the communication unit 113, or information stored in the memory 115, to the integrated terminal 20 through the ECU 101 or by receiving information from the integrated terminal 20 through the ECU 101.

The ECU 101 may generate a control command for operating each component of the vehicle 10.

For example, the ECU 101 may process the information received through the communication unit 113 and transmit the processed information to the integrated terminal 20.

The GPS 103 may receive a GPS signal from a satellite and transmit the received GPS signal to a location management unit 203. The location management unit 203 may generate GPS information including a current location of the vehicle 10 in units of a predetermined time, based on the received GPS signal.

The door sensor 105 may detect whether each of a plurality of vehicle doors is closed, open, or is switched to be opened/closed, may generate a signal (hereinafter, a door sensor signal) indicating a state of each of the plurality of vehicle doors, and transmit the generated signal to the ECU 101.

The plurality of vehicle doors may include a driver door, a passenger door, a left rear door, a right rear door, and a trunk door of the vehicle 10.

The left rear door may be a left door of a second row seat of the vehicle 10, and the right rear door may be a right door of the second row seat of the vehicle 10.

The vehicle 10 may include two or more rows of seats. However, the present invention is not limited thereto, and matters with regard to the left and right rear doors may be equally applied to the left and right doors of three or more rows of seats.

The vehicle speed sensor 107 may detect a current vehicle speed, generate a signal indicating a state of a vehicle speed (hereinafter, a vehicle speed sensor signal), and transmit the generated signal to the ECU 101.

The audio control module 109 may adjust a volume of an audio device of the vehicle 10 when receiving a sound control signal from the ECU 101.

The emergency light control module 11 may turn on or turn off an emergency light of the vehicle 10 when receiving an emergency light control signal from the ECU 101.

The communication unit 113 may transmit the control command of the ECU 101 or information stored in the memory 115 to the outside and transmit information received from the outside to the ECU 101.

The memory 115 may store information necessary to operate each component of the vehicle 10, information to be transmitted to the integrated terminal 20, etc.

The integrated terminal 20 may include an application device 201, the location management unit 203, a microcomputer (MICOM) 205, an application programming interface (API) 207, and an input/output unit 209.

The application device 201 may include a navigation unit 2011 and a meter unit 2013.

An application of the application device 201 may request to transmit a payment request to the communication unit 113 through the API 207, the MICOM 205 and the ECU 101, and the communication unit 113 may transmit the request to the payment server 30.

In the following description, when an application transmits information, a request or the like (hereinafter, collectively referred to as information) to the payment server 30, it may indicate that the application transmits the information to the ECU 101 through the API 207 and MICOM 205, and the communication unit 113 transmits the information received from the application under control of the ECU 101.

In addition, when an application receives information from the payment server 30, it may indicate that the information received from the payment server 30 to the communication unit 113 is transmitted to the ECU 101, the ECU 101 collects information to be transmitted to the application device among the received information and transmits the collected information to the MICOM 205, the MICOM 205 transmits the information received through the API 207 to the application, and the application receives the information.

However, the present invention is not limited thereto, and direct communication may be possible between the application device 201 and the communication unit 113.

The navigation unit 2011 may perform a normal navigation function.

For example, the navigation unit 2011 may search for a route from a departure point to a destination and display the current location of the vehicle in the searched route.

For another example, the navigation unit 2011 may search for a route from a departure point to a destination by using navigation information received from the vehicle 10 and display the current location of the vehicle in the searched route.

Here, the navigation information received from the vehicle 10 may be information generated by a navigation device positioned in the vehicle 10.

In addition, the navigation unit 2011 may identify whether the vehicle arrives at the destination based on the GPS information received from the GPS 103 through the location management unit 203 and transmit destination arrival information to the meter unit 2013.

The meter unit 2013 may include an app meter calculating an operation fee of the vehicle 10 by using the GPS information or information collected by the sensor of the vehicle 10.

In addition, the meter unit 2013 may transmit/receive information to and from the payment server 30 to pay the operation fee of the vehicle 10.

The location management unit 203 may generate the GPS information including the current location of the vehicle 10 by processing the GPS signal received from the GPS 103.

The MICOM 205 may transmit information received from the ECU 101 to the application device 201 through the API 207.

Here, the MICOM 205 may control the API 207 for the information received from the ECU 101 to be transmitted to a corresponding application.

The ECU 101 may transmit the information obtained through the sensor of the vehicle 10 or the communication unit 113, or the information stored in memory 115, to the MICOM 205 through the CAN communication, and the MICOM 205 may transmit the collected information to the corresponding application of the application device 201 through the API 207.

The API 207 may perform communication between the ECU 101 and the application device 201.

For example, the ECU 101 may transmit the information obtained through the sensor of the vehicle 10 or the communication unit 113, or the information stored in the memory 115, to the application device 201 through the API 207.

The input/output unit 209 may generate input information for controlling an operation of the integrated terminal 20 and output an audio signal (or a signal related to hearing), a video signal (or a signal related to sight), an alarm signal or a signal related to a tactile sense.

For example, the input/output unit 209 may be a touch display or the like.

The payment server 30 may perform the payment based on the payment request received from the integrated terminal 20 and transmit payment completion information to the integrated terminal 20.

Figure 2:
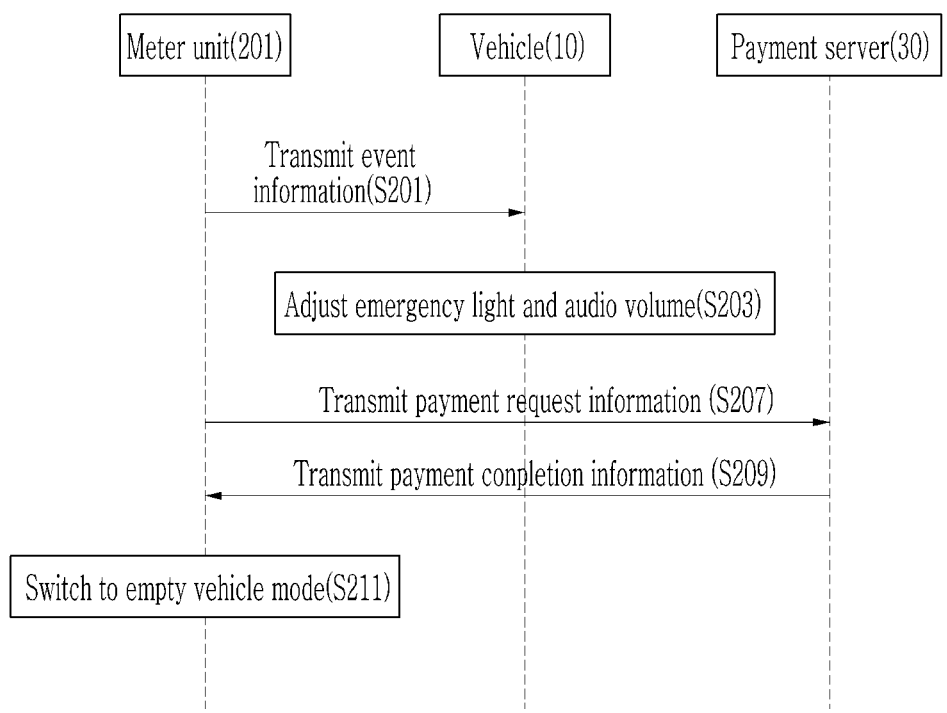
FIG. 2 is a flowchart of a method for supporting for exiting a vehicle according to another exemplary embodiment.

FIG. 2 is a flowchart of a method for supporting for exiting a vehicle according to another exemplary embodiment.

The meter unit 2013 may transmit event information to the vehicle 10 (S201).

For example, the event information may include operation fee payment information received by the meter unit 2013 from the input/output unit 209 or the destination arrival information received from the navigation unit 2011.

The vehicle may adjust the emergency light and the audio volume when receiving the event information from the meter unit 2013 (S203).

Hereinafter, step S203 is described with reference to FIG. 3.

Figure 3:
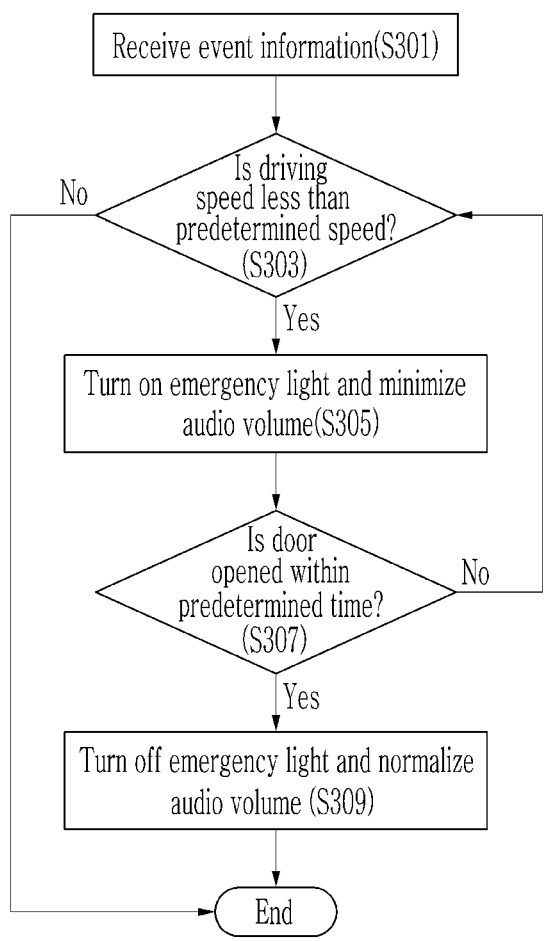
FIG. 3 is a detailed flowchart for explaining step S203 of FIG. 2.

FIG. 3 is a detailed flowchart for explaining step S203.

When receiving the event information (S301), the vehicle 10 may determine whether a driving speed of the vehicle 10 is less than a predetermined speed (S303).

For example, the predetermined speed may be 5 km/h.

When receiving the event information from the meter unit 2013, the ECU 101 may control the vehicle speed sensor 107 to generate the vehicle speed sensor signal and transmit the signal to the ECU 101.

The ECU 101 may determine whether the driving speed of the vehicle 10 is less than 5 km/h through the received vehicle speed sensor signal.

A process of step S203 may end when the driving speed of the vehicle 10 is not less than 5 km/h.

The vehicle 10 may turn on the emergency light and minimize the audio volume when the driving speed of the vehicle 10 is less than the predetermined speed (S305).

For example, the ECU 101 may determine that the driving speed of the vehicle 10 is less than 5 km/h through the received vehicle speed sensor signal.

In this case, the ECU 101 may transmit the emergency light control signal to the emergency light control module 11 so that the emergency light control module 11 turns on the emergency light of the vehicle 10.

In addition, the ECU 101 may transmit the sound control signal to the audio control module 109 so that the audio control module 109 minimizes the volume of the audio device of the vehicle 10.

The vehicle 10 may then determine whether at least one door of the vehicle 10 is switched to be opened within a predetermined time (S307).

For example, the ECU 101 may determine whether at least one door among the plurality of vehicle doors is switched to be opened within the predetermined time through the door sensor signal received from the door sensor 105.

For another example, the ECU 101 may determine whether at least one door among the passenger door and the right rear door, which are the doors at which the taxi passenger mainly enters/exits is switched to be opened within the predetermined time through the door sensor signal received from the door sensor 105.

The process may return to step S303 when at least one door is not switched to be opened within the predetermined time.

The vehicle 10 may turn off the emergency light and normalize the audio volume when at least one door is switched to be opened within the predetermined time (S309).

Here, there may be a time difference between the time when the door is switched to be opened and the time when the emergency light is turned off.

In addition, there may be a time difference between the time when the door is switched to be opened and the time when the audio volume is normalized.

For example, the ECU 101 may determine that at least one door among the plurality of vehicle doors is switched to be opened within the predetermined time through the received door sensor signal.

The ECU 101 may then transmit the emergency light control signal to the emergency light control module 111 so that the emergency light control module 111 turns on the emergency light of the vehicle 10.

In addition, the ECU 101 may transmit the sound control signal to the audio control module 109 so that the audio control module 109 normalizes the volume of the audio device of the vehicle 10 to be in a state before being minimized.

In addition, the meter unit 2013 may transmit payment request information to the payment server 30 (S207), and the payment server 30 may transmit the payment completion information to the meter unit 2013 after the payment is completed (S209).

The meter unit 2013 may switch its state to an empty vehicle mode when receiving the payment completion information (S211).

For example, the state of the meter unit 2013 may be divided into a driving mode or the empty vehicle mode.

The driving mode may indicate a state where the driver provides the taxi service as the passenger enters the vehicle 10, and the meter unit 2013 may calculate the operation fee.

The empty vehicle mode may indicate a state where the driver stands by to provide the taxi service because no passenger is in the vehicle 10, and the meter unit 2013 may stand by to calculate the operation fee.

In addition, when there is an empty vehicle light separately installed on the vehicle 10, the meter unit 2013 may generate a control signal to turn on the empty vehicle light in the empty vehicle mode.

FIG. 3 shows that the emergency light is turned off when the door is opened after the emergency light is turned on, and the present invention is not limited thereto.

For example, the emergency light may not be turned off when the door is switched to be opened.

Instead, the emergency light may maintain the state of being turned on even when the door is switched to be opened, and the emergency light may be turned off when the opened door is closed.

Alternatively, the emergency light may maintain the state of being turned on while the vehicle 10 is stopped even when the opened door is closed, and the emergency light may be turned off when the vehicle 10 starts its travel.

As set forth above, it is possible to improve the efficient communication between the driver and the passenger, minimize the driver's distraction, and promote the safety of the passenger by the integrated terminal and the vehicle linked with each other to control the emergency light and the audio volume by identifying the time when the passenger exits the vehicle.

As set forth above, it is possible to increase conveniences of the driver and the passenger by quickly and easily reflecting the state of the vehicle by the integrated terminal and the payment server linked with each other to switch the app meter to be in the empty vehicle mode by identifying the time when the passenger exits the vehicle.

Although the exemplary embodiments of the present invention have been described in detail hereinabove, the scope of the present invention is not limited thereto. Various modifications and improvements made by those skilled in the art to which the present invention pertains also belong to the scope of the present invention.

What is claimed is:

1. A system for providing a taxi service, the system comprising:
   an integrated terminal connected to a payment server through a network,
   wherein:
      the integrated terminal comprises a meter unit comprising an app meter calculating an operation fee of a vehicle by using global positioning system (GPS) information or information collected by a sensor of the vehicle,
      the meter unit is configured to:
         calculate the operation fee of the vehicle by using the GPS information or the information collected by the sensor of the vehicle;
         transmit event information comprising operation fee payment information or destination arrival information to the vehicle; and
         be switched to be in an empty vehicle mode when receiving payment completion information from the payment server in response to a payment request, and
      the vehicle comprises:
         an Electronic Control Unit (ECU) generating a control command for operating each component of the vehicle;
         an audio control module receiving a sound control signal from the ECU and adjusting a volume of an audio device of the vehicle, and
         an emergency light control module receiving an emergency light control signal from the ECU and adjusting an emergency light of the vehicle, wherein:
            when the audio control module and the emergency light control module receive the event information from the meter unit, the audio control module adjusts the volume of the audio device of the vehicle and the emergency light control module adjusts the emergency light of the vehicle,
            when the ECU determines that a driving speed is less than a predetermined speed, the audio control module adjusts the volume of the audio device of the vehicle and the emergency light control module adjusts the emergency light of the vehicle, and
            when the ECU determines that a door of the vehicle is switched to be opened within a predetermined time, the audio control module adjusts the volume of the audio device of the vehicle and the emergency light control module adjusts the emergency light of the vehicle.

2. The system of claim 1, wherein adjustment of the emergency light comprises the vehicle turning on the emergency light when the driving speed is less than the predetermined speed.

3. The system of claim 1, wherein adjustment of the volume of the audio device comprises the vehicle minimizing the volume when the driving speed is less than the predetermined speed.

4. The system of claim 1, wherein adjustment of the emergency light comprises the vehicle turning off the emergency light when the door is switched to be opened within the predetermined time.

5. The system of claim 1, wherein adjustment of the volume of the audio device comprises the vehicle normalizing the volume when the door is switched to be opened within the predetermined time.

6. The system of claim 1, wherein:
   the empty vehicle mode is a state in which a driver stands by to provide the taxi service because no passenger is in the vehicle; and
   the meter unit stands by without calculating the operation fee in the empty vehicle mode.

7. A method for providing a taxi service, the method comprising:
   calculating, by a meter unit, an operation fee of a vehicle;
   transmitting, by the meter unit, an event information to the vehicle, the event information comprising operation fee payment information or destination arrival information; and
   switching, by the meter unit, an integrated terminal to be in an empty vehicle mode when receiving payment completion information in response to a payment request from a payment server; and
   adjusting, by the vehicle, an audio volume when receiving the event information from the integrated terminal,
   wherein the integrated terminal comprises the meter unit comprising an app meter calculating the operation fee of the vehicle by using a global positioning system (GPS) information or information collected by a sensor of the vehicle, and
   wherein the vehicle comprises an Electronic Control Unit (ECU) generating a control command for operating each component of the vehicle, an audio control module receiving a sound control signal from the ECU and adjusting a volume of an audio device of the vehicle, and an emergency light control module receiving an emergency light control signal from the ECU and adjusting an emergency light of the vehicle, wherein:
      when the audio control module and the emergency light control module receive the event information from the meter unit, the audio control module adjusts the volume of the audio device of the vehicle and the emergency light control module adjusts the emergency light of the vehicle,
      when the ECU determines that a driving speed is less than a predetermined speed, the audio control module adjusts the volume of the audio device of the vehicle and the emergency light control module adjusts the emergency light of the vehicle, and
      when the ECU determines that a door of the vehicle is switched to be opened within a predetermined time, the audio control module adjusts the volume of the audio device of the vehicle and the emergency light control module adjusts the emergency light of the vehicle.

8. The method of claim 7, wherein adjusting the emergency light or the audio volume when the driving speed is less than the predetermined speed comprises turning on, by the vehicle, the emergency light when the driving speed is less than the predetermined speed.

9. The method of claim 7, wherein adjusting the emergency light or the audio volume when the driving speed is less than the predetermined speed comprises minimizing, by the vehicle, the audio volume when the driving speed is less than the predetermined speed.

10. The method of claim 7, wherein adjusting the emergency light or the audio volume when the door is switched to be opened within the predetermined time comprises turning off, by the vehicle, the emergency light when the door is switched to be opened within the predetermined time.

11. The method of claim 7, wherein adjusting the emergency light or the audio volume when the door is switched to be opened within the predetermined time comprises normalizing, by the vehicle, the audio volume when the door is switched to be opened within the predetermined time.

12. The method of claim 7, further comprising standing by, by the integrated terminal, without calculating the operation fee in the empty vehicle mode, wherein the empty vehicle mode is a state in which a driver stands by to provide the taxi service because no passenger is in the vehicle.

13. A system for providing a taxi service, the system comprising:
    a vehicle comprising an Electronic Control Unit (ECU), a door, a sensor, an audio control module, and an emergency light control module;
    a payment server connected to the vehicle through a network; and
    an integrated terminal provided in the vehicle and a meter unit comprising an app meter calculating an operation fee of the vehicle by using global positioning system (GPS) information or information collected by the sensor of the vehicle, the meter unit, configured to:
        calculate the operation fee of the vehicle;
        transmit event information comprising operation fee payment information or destination arrival information to the vehicle; and
        be switched to be in an empty vehicle mode when receiving payment completion information from the payment server in response to a payment request,
    wherein the vehicle is configured to control the audio control module or the emergency light control module to adjust an emergency light and an audio volume,
    wherein the ECU generates a control command for operating each component of the vehicle, and wherein:
        when the audio control module and the emergency light control module receive the event information from the meter unit, the audio control module adjusts the audio volume of an audio device of the vehicle and the emergency light control module adjusts the emergency light of the vehicle,
        when the ECU determines that a driving speed is less than a predetermined speed, the audio control module adjusts the audio volume of the audio device of the vehicle and the emergency light control module adjusts the emergency light of the vehicle, and
        when the ECU determines that the door of the vehicle is switched to be opened within a predetermined time, the audio control module adjusts the audio volume of the audio device of the vehicle and the emergency light control module adjusts the emergency light of the vehicle.

14. The system of claim 13, wherein, the empty vehicle mode indicates a mode in which a driver stands by to provide the taxi service because no passenger is in the vehicle and the integrated terminal stands by without calculating the operation fee.

* * * * *